United States Patent
Tandon et al.

(10) Patent No.: US 11,347,795 B2
(45) Date of Patent: May 31, 2022

(54) TOOLS AND METHODS THAT FORMAT MAPPING INFORMATION FROM A DATA INTEGRATION SYSTEM

(71) Applicant: salesforce.com, inc., San Francisco, CA (US)

(72) Inventors: Prateek Tandon, Fremont, CA (US); Harsha Vardhan Parvataneni, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 238 days.

(21) Appl. No.: 16/536,017

(22) Filed: Aug. 8, 2019

(65) Prior Publication Data

US 2021/0042353 A1 Feb. 11, 2021

(51) Int. Cl.
*G06F 7/00* (2006.01)
*G06F 16/84* (2019.01)
*G06F 16/13* (2019.01)
*G06F 16/901* (2019.01)

(52) U.S. Cl.
CPC ............. *G06F 16/86* (2019.01); *G06F 16/13* (2019.01); *G06F 16/9017* (2019.01); *G06F 16/9027* (2019.01)

(58) Field of Classification Search
CPC .. G06F 16/86; G06F 16/9017; G06F 16/9027; G06F 16/13
USPC .......................... 707/708, 780, 803, 999.006
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Md I Uddin
(74) *Attorney, Agent, or Firm* — LKGlobal | Lorenz & Kopf, LLP

(57) ABSTRACT

Provided are tools and methods for formatting mapping information from a data integration system (DIS) having stored therein a plurality of instances of mapping information, wherein an instance of mapping information includes information related to a data transfer between sources and targets coupled to the data integration system. The method includes generating and displaying a graphical user interface (GUI) on a display system and accepting user selections and input responsive thereto. The method includes receiving a user request for a mapping level dependency or for a port dependency table. The method prompts the user and receives user input to complete a search of the DIS according to the user request. All instances of mapping information matching the user request are found and the information is formatted and displayed in an intuitive format, such as a hierarchical tree structure or a table.

18 Claims, 10 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,274,811 B1* | 3/2016 | Reeves .................. G06F 8/65 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0077571 A1* | 3/2008 | Harris .................. G06F 16/951 |
| | | 707/999.005 |
| 2008/0249972 A1 | 10/2008 | Dillon |
| 2008/0295101 A1* | 11/2008 | Vicars .................. G06Q 10/10 |
| | | 707/E17.008 |
| 2008/0306983 A1* | 12/2008 | Singh .................. G06F 40/18 |
| 2009/0012983 A1* | 1/2009 | Senneville ............ G06F 16/256 |
| 2009/0063414 A1 | 3/2009 | White et al. |
| 2009/0100342 A1 | 4/2009 | Jakobsen |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |

\* cited by examiner

TOOLS AND METHODS THAT FORMAT MAPPING INFORMATION FROM A DATA INTEGRATION SYSTEM

TECHNICAL FIELD

Embodiments of the subject matter described herein relate generally to data integration systems that move data between sources. More particularly, embodiments of the subject matter described herein relate to formatting mapping information from a data integration system.

BACKGROUND

A data integration system (also referred to as a relational database) can store, manipulate, and organize data for businesses, organizations, individuals, and various other users. The data integration system may be in operable communication with multiple different sources, between which it organizes transfers of data. A transfer of data from a source to another source may be referred to as a step in a workflow, and, in various embodiments, a source that is a recipient of data may be referred to as a target. The data integration system generally stores metadata describing the structure of each source that it is in communication with, and the workflows that associate the sources and targets. Therefore, wherein an instance of mapping information is defined as having information related to a data transfer between a source and a target, the data integration system stores a plurality of instances of mapping information related to sources and targets.

In some scenarios, it may be desirable to query the data integration system to view and further manipulate only specific data, such as an object or a field, among the plurality of instances of mapping information. Finding such specific data in the data integration system can be very tedious and labor intensive, often requiring a manual review of human written code. Therefore, tools and methods for formatting and presenting mapping information from data integration systems are desirable.

SUMMARY

Some embodiments provide user interface tool, including: a display system; a processor to generate and display a graphical user interface (GUI) on the display system and to accept user input responsive to the GUI; and a data integration system having stored therein a plurality of instances of mapping information related to S sources and T targets, wherein an instance of mapping information includes information related to a data transfer between a source of the S sources and a target of the T targets; the processor to receive user input that is a user request for a mapping level dependency in the plurality of instances of mapping information that includes a mapping name and a folder, the user request specifying either a forward dependency or a backward dependency; the processor to respond to the user request by: searching the data integration system for all instances of mapping information having the mapping name in the folder, to thereby format a tree of found instances; displaying, on the display system, entries in the tree of found instances that lead up to the mapping name in the folder when the backward dependency is specified; and, displaying on the display system, entries in the tree of found instances that extend after the mapping name in the folder when the forward dependency is specified.

Some embodiments provide a processor-implemented method for formatting mapping information from a data integration system having stored therein a plurality of instances of mapping information related to S sources and T targets, wherein an instance of mapping information includes information related to a data transfer between a source of the S sources and a target of the T targets, the method including: generating and displaying a graphical user interface (GUI) on a display system and accepting user input responsive thereto; receiving user input that is a user request for a mapping level dependency in the plurality of instances of mapping information, the user request including a mapping name and a folder, the user request specifying either a forward dependency or a backward dependency; responding to the user request by: searching the data integration system for all instances of mapping information having the mapping name in the folder, to thereby format a tree of found instances; displaying, on the display system, entries in the tree of found instances that lead up to the mapping name in the folder when the backward dependency is specified; and, displaying on the display system, entries in the tree of found instances that extend after the mapping name in the folder when the forward dependency is specified.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented herein generally relate to tools and methods that format and display mapping information from data integration systems. Functionally, these embodiments search the data integration system, find targeted information, format the targeted information into tables and/or trees and display the targeted information in an intuitive and easy to comprehend graphical user interface (GUI). Utilizing the provided GUI for user input to direct the search of the data integration system, and formatting and displaying the search results, as described hereinbelow, delivers a functional improvement in the overall performance and utility of the data integration system. Exemplary embodiments may be implemented with a variety of data integration system configurations, including but not limited to, multi-tenant database systems and multi-tenant application systems.

Figure 1:
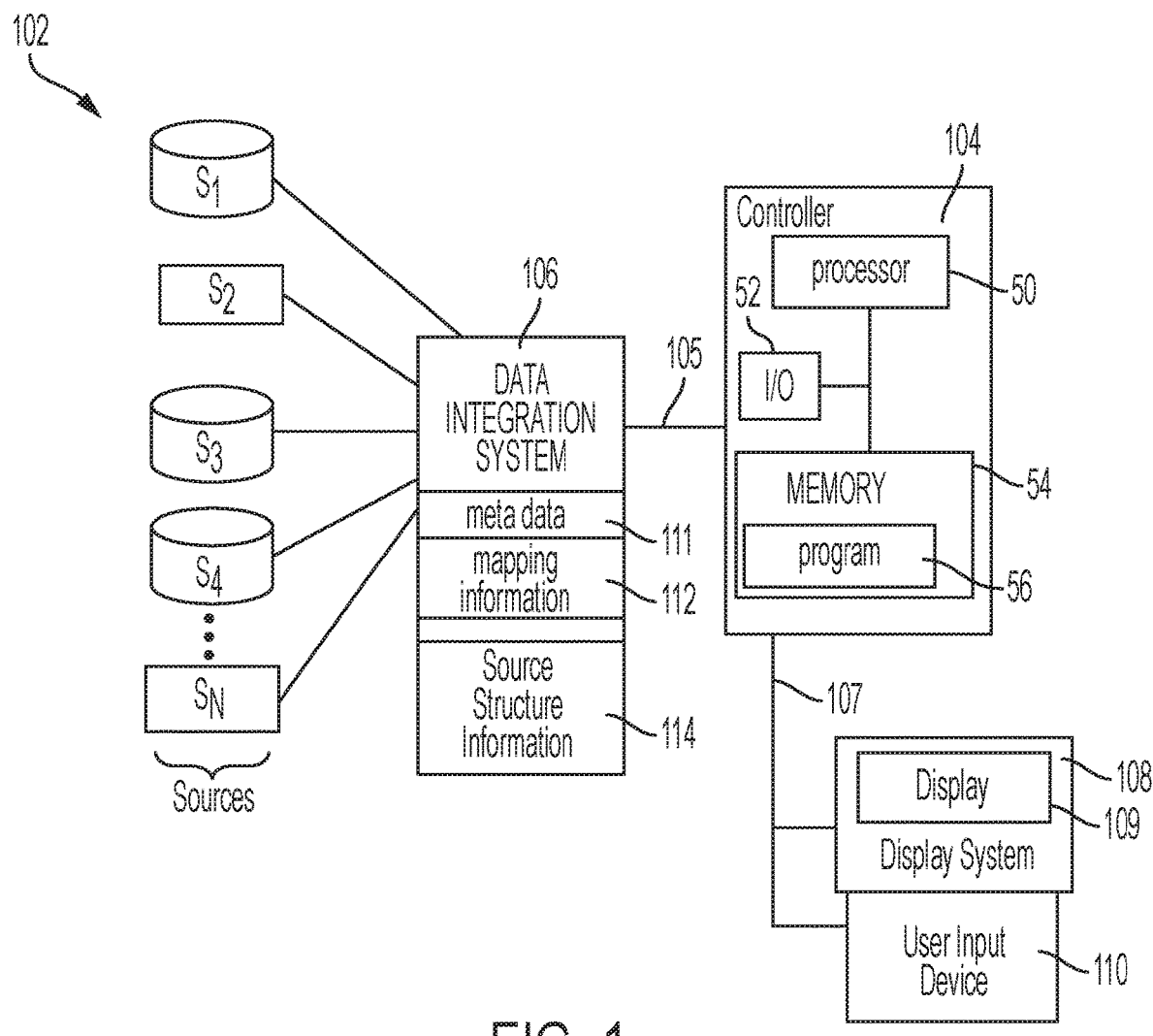
FIG. 1 is a block diagram of a tool that formats mapping information from a data integration system, in accordance with various embodiments.

Turning now to FIG. 1, an exemplary embodiment of a user interface tool 102 that formats mapping information from a data integration system (simplified herein to user interface tool 102) generally includes an automation controller 104 that operationally couples a data integration system 106 to a display system 108 and user input device 110; the display system 108 and user input device 110 are often combined, for example, as part of a portable electronic device, laptop, or touchscreen display system. The data integration system 106 is in operational communication with N sources of data, indicated as S1, S2, S3, S4 and $S_N$. The link 105 between the automation controller 104 and the data integration system 106, as well as the link 107 between the automation controller 104 and the display system 108/user input device 110 may be wired or wireless, may be via a network, and/or may be through a cloud service, and each link (105, 107) utilizes a suitable communication protocol to perform the operations as described herein.

The display system 108 contains the graphical processing software to generate a graphical user interface (GUI) with various selectable control elements, such as tiles and buttons, as described herein. The display 109 represents the image-rendering portion of the display system, and when a graphical user interface is said to be rendered or displayed, it is visible to an observer on the display 109. As mentioned, the display system 108 may utilize a touch screen display, in which case the display 109 and the user input device 110 may be at least partially integrated. Only one combination of a display system 108 and user input device 110 is shown in communication with the automation controller 104, via link 107, for the purpose of discussion; however, in other embodiments, the automation controller 104 may be in operable communication with a plurality of combinations of a display system 108 and user input device 110; each via a separate dedicated link 107.

The functionality of the user interface tool 102 is primarily controlled by the automation controller 104; therefore, functionality attributed to the user interface tool 102 can be attributed to the automation controller 104. As used herein, the term "controller" refers to any means for facilitating communications and/or interaction between the components of the user interface tool 102 and performing additional processes, tasks and/or functions to support operation of the user interface tool 102, as described herein. Depending on the embodiment, the automation controller 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In an exemplary embodiment depicted in FIG. 1, the automation controller 104 takes the form of conventional processing hardware, such as a processor 50, non-transitory storage or memory 54, input/output features 52 and the like. The processor 50 may be implemented using one or more of microprocessors, microcontrollers, processing cores and/or other computing resources spread across any number of distributed or integrated systems, including any number of "cloud-based" or other virtual systems. The memory 54 represents any non-transitory short- or long-term storage or other computer-readable media capable of storing computer-executable programming instructions for execution on the processor 50, including any sort of random-access memory (RAM), read only memory (ROM), flash memory, magnetic or optical mass storage, and/or the like. The computer-executable programming instructions 56, when read and executed by the processor 50, cause the processor 50 to create, generate, or otherwise perform one or more additional tasks, operations, functions, and/or processes attributed to the user interface tool 102, as described herein. It should be noted that the memory 54 represents one suitable implementation of such computer-readable media, and alternatively or additionally, the processor 50 could receive and cooperate with external computer-readable media that is realized as a portable or mobile component or application platform, e.g., a portable hard drive, a USB flash drive, an optical disc, or the like. The input/output features 52 represent conventional interfaces to networks (e.g., to links 105 and 107, or any other local area, wide area, or other network), cloud, mass storage, display devices, data entry devices and/or the like.

The program 56 comprises the configurable and/or activatable instructions and/or algorithm that, when executed by a processing architecture, direct operations of the user interface tool 102, as described herein. In various embodiments, the processor 50 and memory 54 are integrated, and the processor 50 is said to be programmed when the program 56 is present in the memory 54. In various embodiments, the program 56 may be stored as a program product and transmitted via signal bearing media to a processor 50 architecture for operation. In various embodiments, during operation, the processor 50 loads and executes the program 56 in memory 54. Accordingly, in various embodiments, the functions of the user interface tool 102 may be attributed to the processor 50.

The data integration system 106 includes a storage location of metadata 111. Metadata 111 may describe any number of forms, reports, workflows, user access privileges, business logic and other constructs. The data integration system 106 generally stores metadata 111 describing the structure of each source that it is in communication with (source structure information 114), and the workflows that associate the sources and targets (mapping information 112). As used herein, each instance of mapping information 112 within a plurality of instances of mapping information 112 includes information related to a unique data transfer between the N sources. Any given transfer between two of the N sources may be described directionally as a transfer from a source to a target. For a variety of reasons, the number of sources and targets may not be equal, therefore, S sources and T targets are referenced herein. The data integration system 106 stores a plurality of instances of mapping information related to S sources and T targets.

Figure 10:
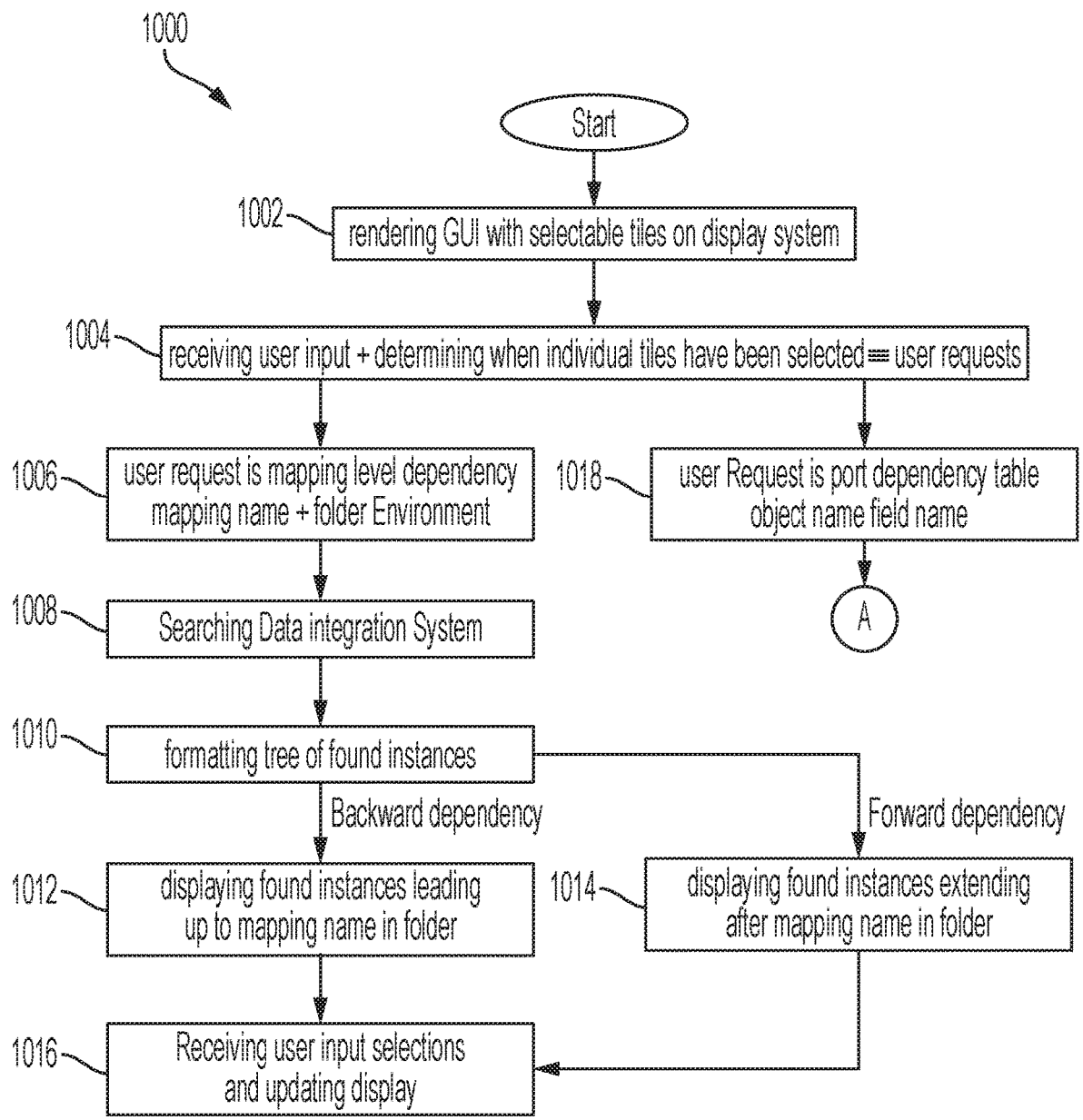
FIGS. 10 and 11 depict operational steps of an exemplary method for formatting mapping information from a data integration system.
Figure 11:
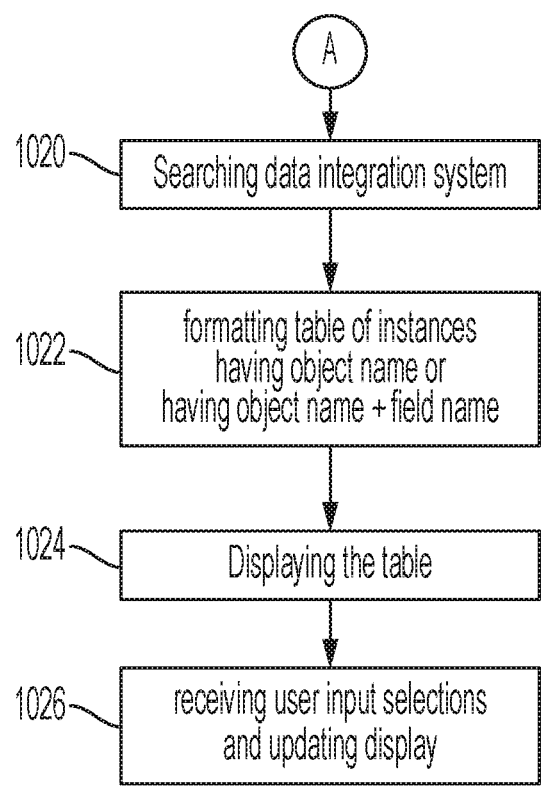

As mentioned, querying the data integration system 106 to view and further manipulate only specific data, such as an object or a field, among the plurality of instances of mapping information presents a technical problem, because it can be can be very tedious and labor intensive, often requiring a manual review of human written code, to find the specific data in the data integration system 116. This technical problem is especially challenging when transfers, also called transformations, have labels or names that do not reference the specific data that is the target of the query. Embodiments of the user interface tool 102 and related methods (FIGS. 10-11) provide a technical solution to this problem. FIGS. 2-9 illustrate various views of a graphical user interface GUI that may be generated in accordance with exemplary embodiments.

Figure 2:
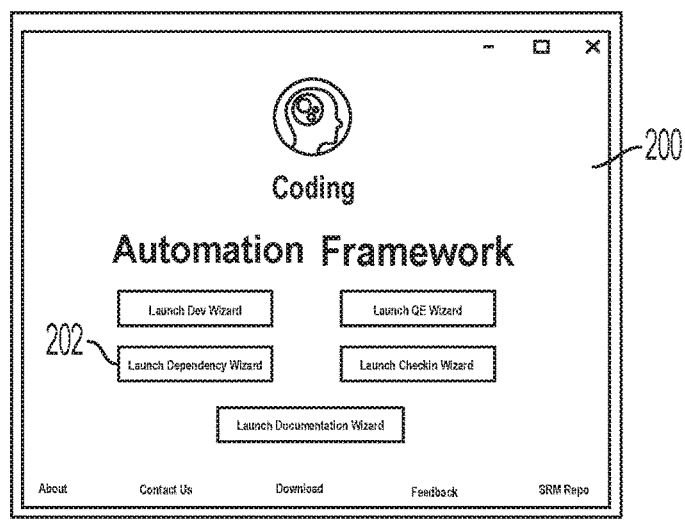
FIGS. 2-9 are illustrations of graphical user interfaces (GUIs) with formatted mapping information, as generated in accordance with various embodiments.
Figure 3:
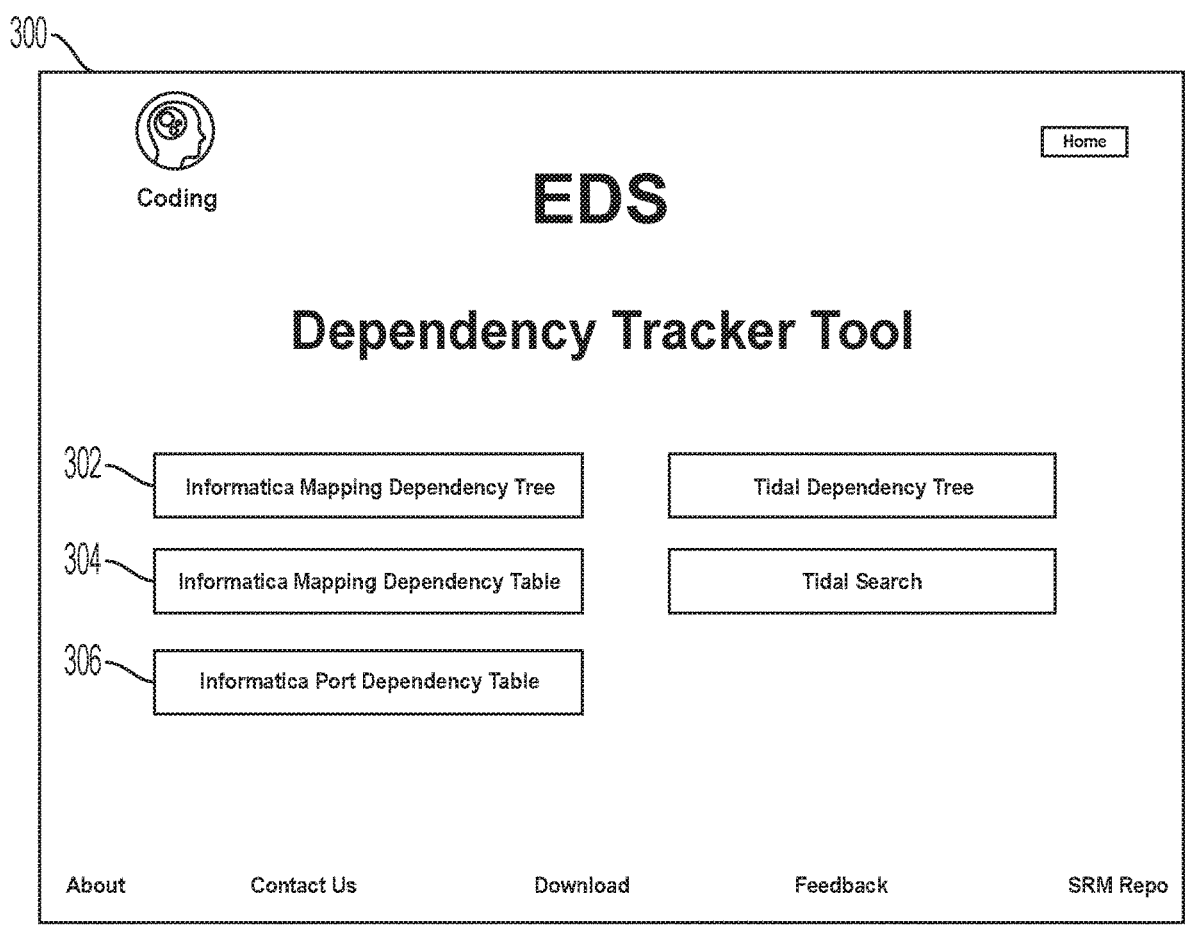
Figure 4:
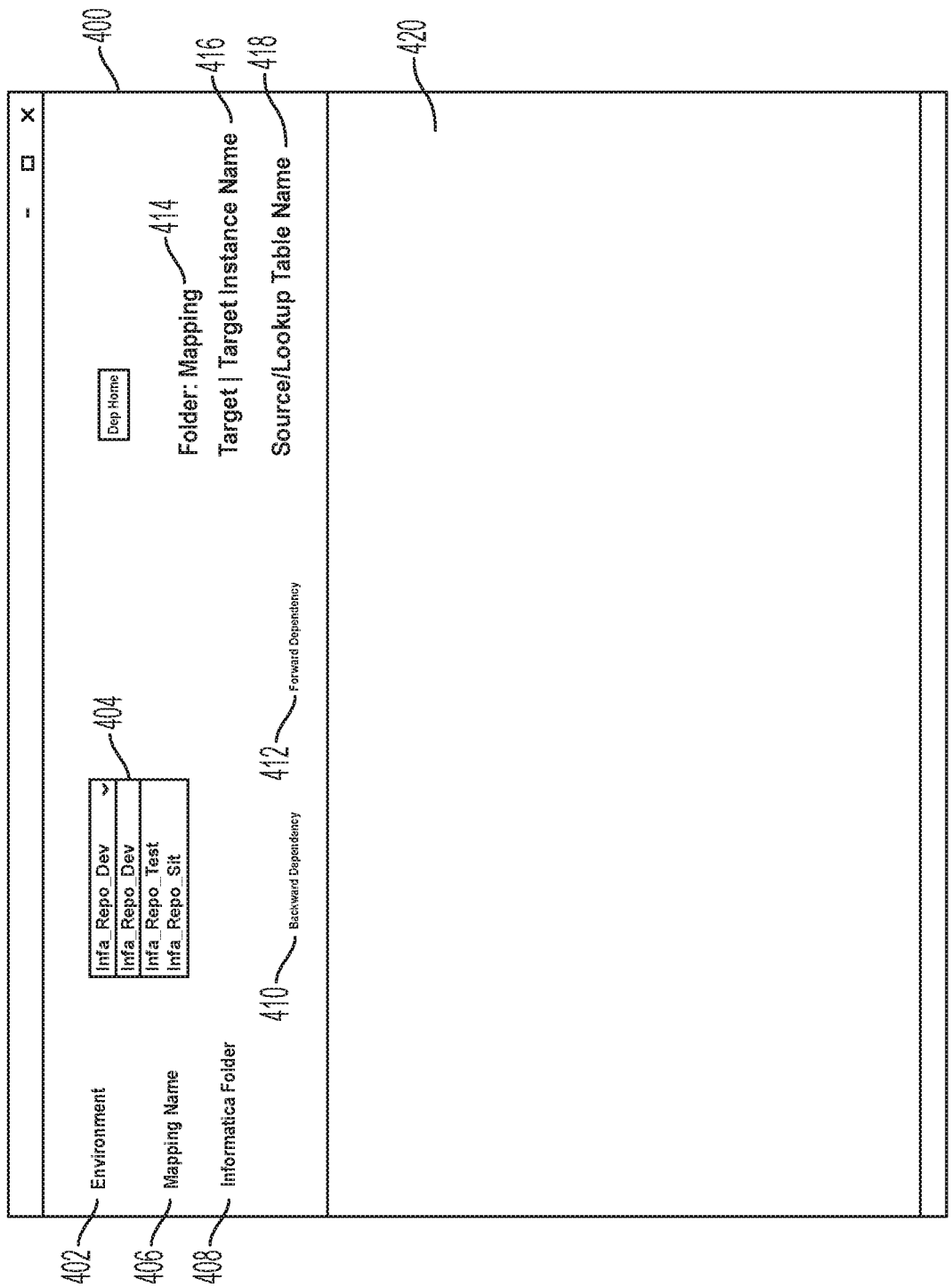

With reference to FIGS. 2-3, exemplary embodiments of a graphical user interface (GUI) that may be rendered by the user interface tool 102 and used for starting a query are depicted. The rendered GUI (operation 1002) includes selectable control elements that are displayed as tiles, radio buttons, and text boxes. The user interface tool 102 renders the GUI and is receptive to user input from the user input device 110. User input is processed by the user interface tool 102 to determine when individual selectable tiles are selected (at operation 1004), and the user interface tool 102 responds to user selections by updating the GUI, often this includes a GUI that is responsive to the user's request (see, operations 1016 and 1026), and prompts the user to enter additional information and/or to display trees, tables, and information.

In an exemplary embodiment, on GUI 200, a selectable tile 202 may prompt the user to launch a dependency wizard. Once the dependency wizard is launched, GUI 300 may be displayed, having rendered thereon selectable tile 302 for launching a mapping dependency tree, selectable tile 304 for launching a mapping dependency table, and a selectable tile 306 for launching a port dependency table.

In an example, receiving a user request for a mapping level dependency tree (at operation 1006) may include the steps of: determining that the user has selected the tile 302 indicating the mapping dependency tree; updating the GUI 300 to GUI 400 responsive thereto (i.e., updating the GUI from GUI 300 to GUI 400, responsive to determining that the user has selected the tile 302 indicating the mapping dependency tree), to prompt the user to enter the mapping name 406 and folder name 408; and, receiving user input providing the mapping name 406 and folder name 408. The user interface tool 102 may also prompt the user to select an environment 402, which would constrain where the user interface tool 102 searches within the data integration system 106. In various embodiments, receiving a user request for a mapping level dependency tree (at operation 1006) additionally includes receiving, via the user interface tool 102, an environment 402. Examples of environments 402 include: development, test, and production.

Figure 5:
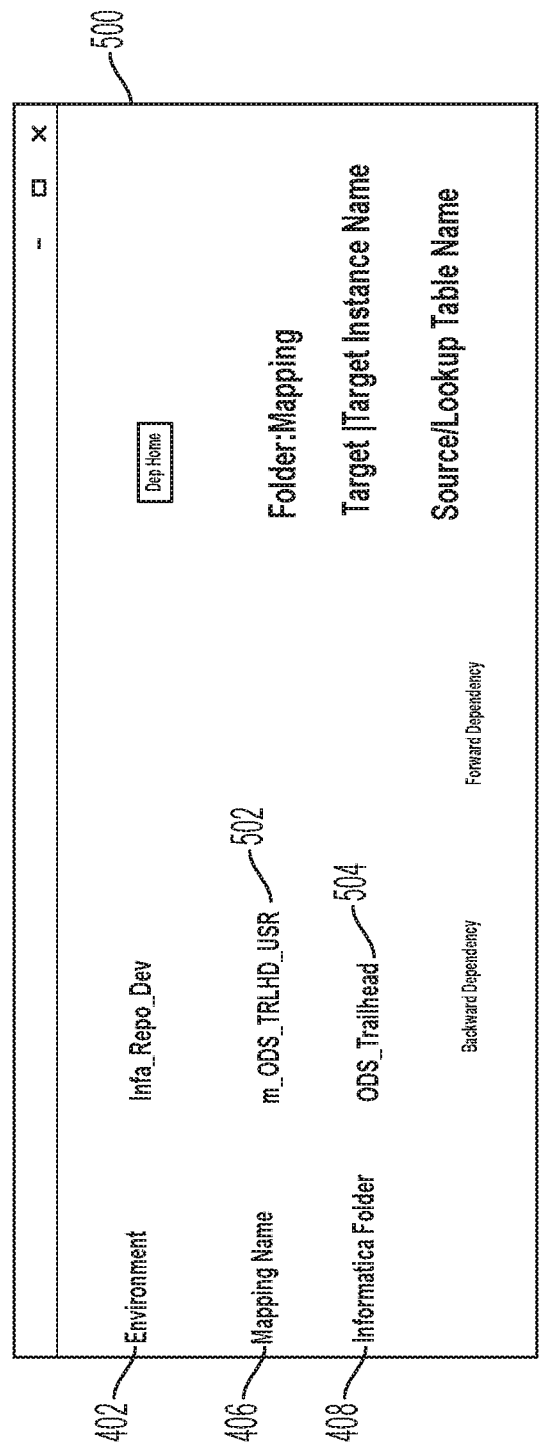

The user interface tool 102 receives and displays alphanumeric user input for the mapping name (FIG. 5, 502) and folder name (FIG. 5, 504). During a mapping level dependency user request, the user interface tool 102 may further tailor the GUI (400 and 500) to provide intuitive user feedback by rendering context-relevant alphanumeric information; in various embodiments, this may include "Folder: Mapping" 414, "Target|Target Instance Name" 416, and "Source/Lookup Table Name" 418. The user interface tool 102 may designate a portion 420 of each displayed GUI for displaying formatted search responses to user query information.

Figure 6:
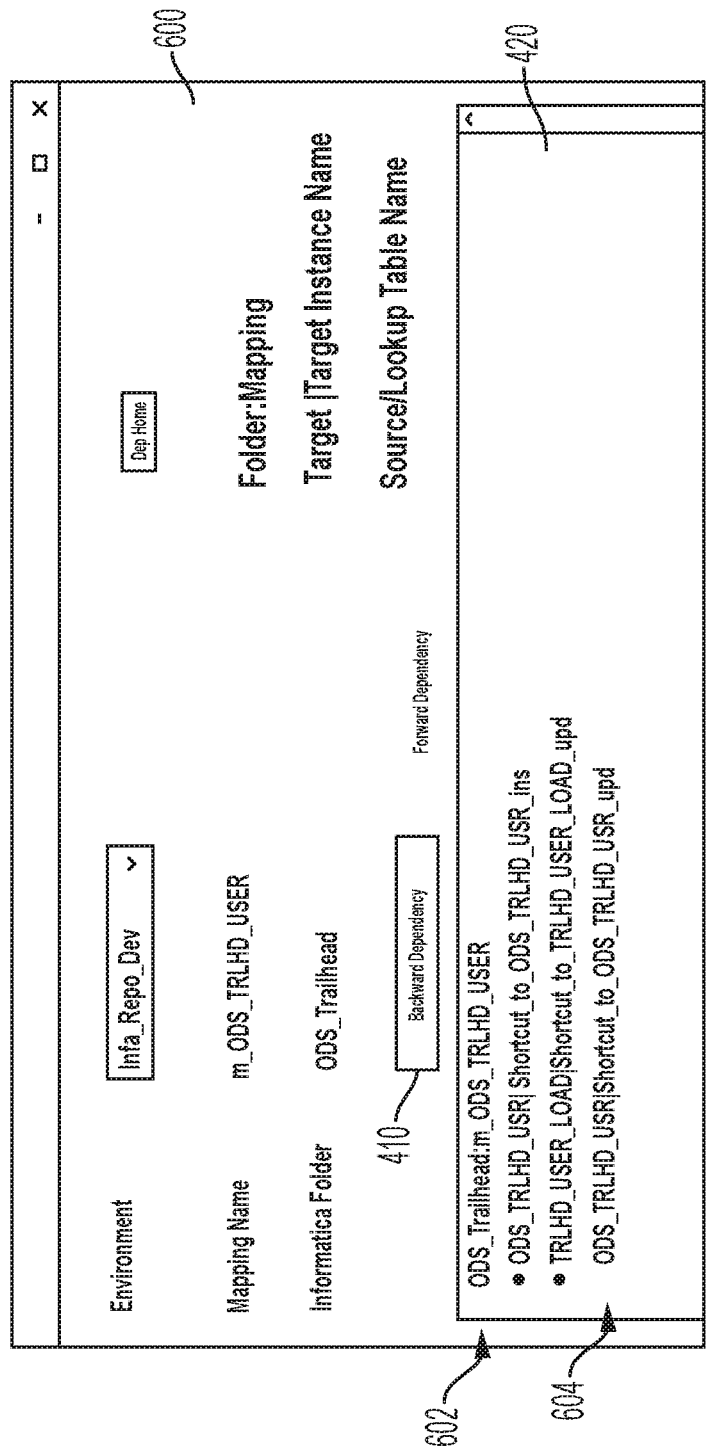

In the example shown in FIG. 6, the user interface tool 102 has received user input providing a mapping name m_ODS_TRLHD_USER and a folder ODS_Trailhead. The user interface tool 102 has additionally received a user selected backward dependency 410. At operation 1008, the user interface tool 102 searches the mapping information on the data integration system 106 for all instances of mapping information that matches the user request (e.g., the mapping name and folder), receives the query/search results, and formats the query/search results (operation 1010) into an intuitive format, such as a tree structure. As used herein the tree structure is referred to as a tree of found instances of the mapping name and folder. The processor 50 formats the tree of found instances of the mapping name and folder to visually communicate a temporal flow of data, backwards and forwards in time. At least one of the instances in the tree of found instances is a target and at least one of the instances in the tree of found instances is a source. The processor 50 may display the tree of found instances as a hierarchical director structure of folders and files. As mentioned, the user request may include selection of a backward dependency or a forward dependency. Responsive to a backward dependency selection, the formatted mapping information displayed by the user interface tool 102 includes entries in the tree of found instances that lead up to the mapping name in the folder when the backward dependency is specified (operation 1012).

Figure 7:
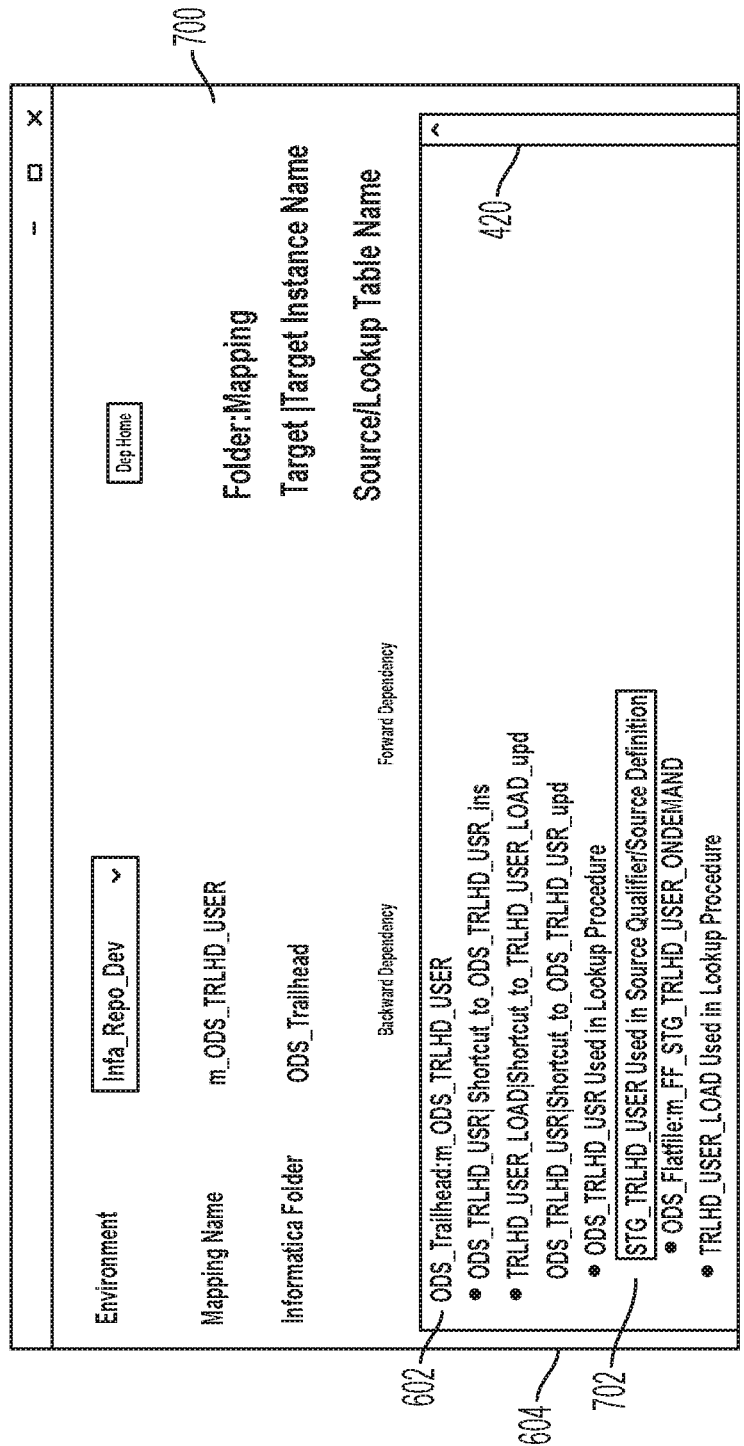

With focus again on the provided example, in FIG. 6, the formatted tree includes folder:mapping name 602 of ODS_Trailhead: m_ODS_TRLHD_USER, reflecting a user input request. The formatted mapping information provided by the user interface tool 102 includes a target|target instance name 604 of ODS_TRLHD_USER| Shortcut_to_ODS_TRLHD_USER_upd. In FIG. 7, the user interface tool 102 has expanded another level of the formatted mapping information (i.e., the tree hierarchy), responsive to a received user selection (at operation 1016) of target-|target instance name 604. The formatted mapping information provided by the user interface tool 102, responsive thereto, shows a Source/Lookup Table Name 702 of: STG_TRLHD_USER Used in Source Qualifier/Source Definition.

Figure 8:
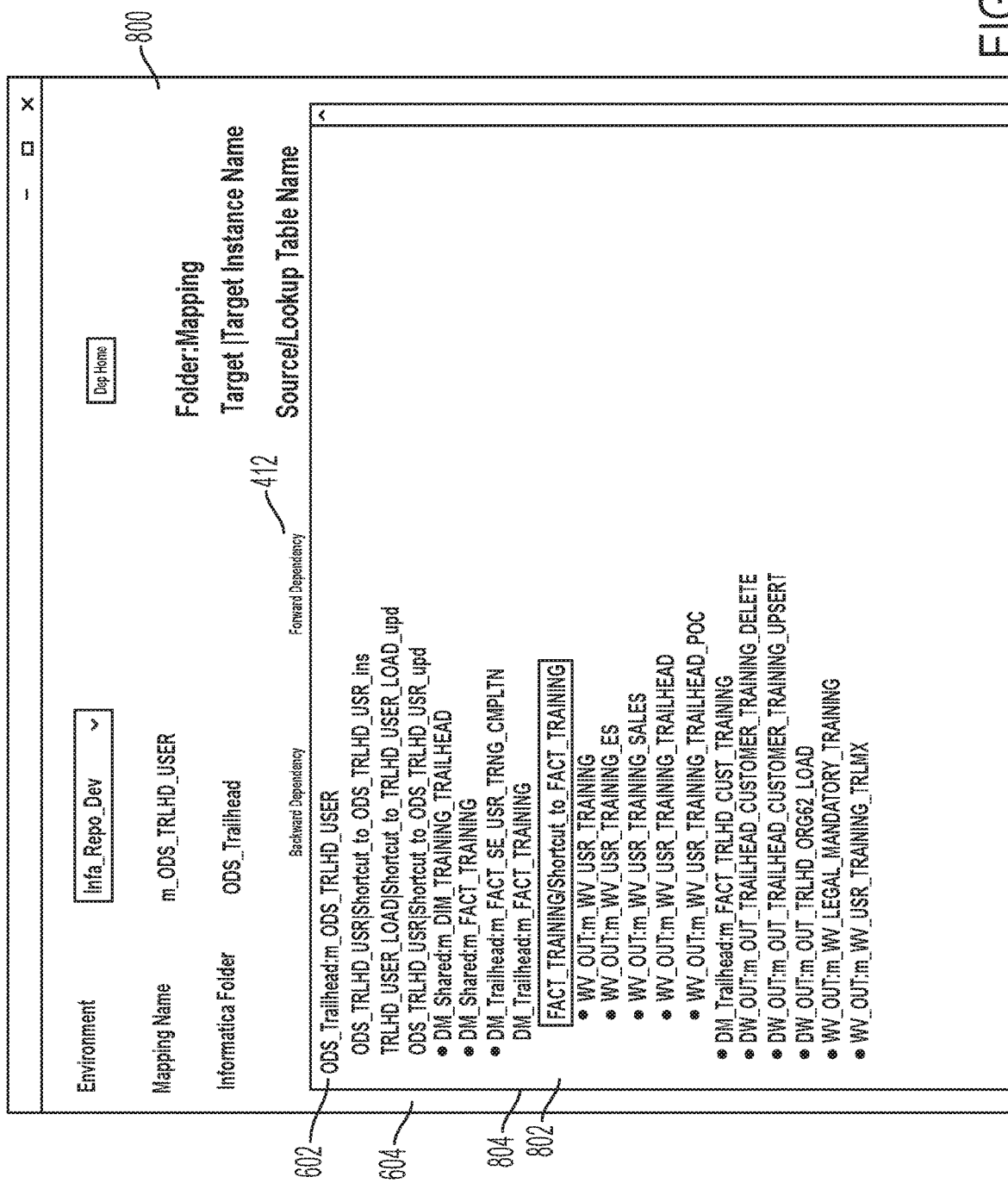

If, instead of requesting a backward dependency, the user requested a forward dependency 412, and again using the folder:mapping name 602 of ODS_Trailhead: m_ODS_TRLHD_USER, the displayed formatted mapping information (at operation 1014) may look something like what is shown in FIG. 8, GUI 800. Again, the processor 50 may display a tree of found instances as a hierarchical directory structure of folders and files. The target|target instance name 604 of ODS_TRLHD_USER|Shortcut_to_ODS_TRLHD_USER_upd is found in entries extending after folder: mapping name 602, and in a folder:mapping name 804 of DM_Trailhead:m_FACT_TRAINING, there is a target|target instance name 802 of FACT_TRAINING|Shortcut_to_FACT_TRAINING.

Alternately, the user request may be for mapping information formatted as a port dependency table, and the user interface tool 102 responds accordingly. In these scenarios, it is contemplated that the selectable tile 306 (on the GUI 300 of FIG. 3), for a port dependency table, is first selected by the user. At operation 1018, the controller 104 processes the user input and determines that the user request is for a port dependency table. In some embodiments, subsequent to a user request for a port dependency table, the user interface tool 102 may prompt the user for, and receive therefrom, an object name (at operation 1018). In various embodiments, subsequent to a user request for a port dependency table, the user interface tool 102 may prompt the user for, and receive therefrom, an object name and a field name (at operation 1018). In various embodiments of user requests for a port dependency table, the user may be prompted for an environment 402, as described above.

Figure 9:
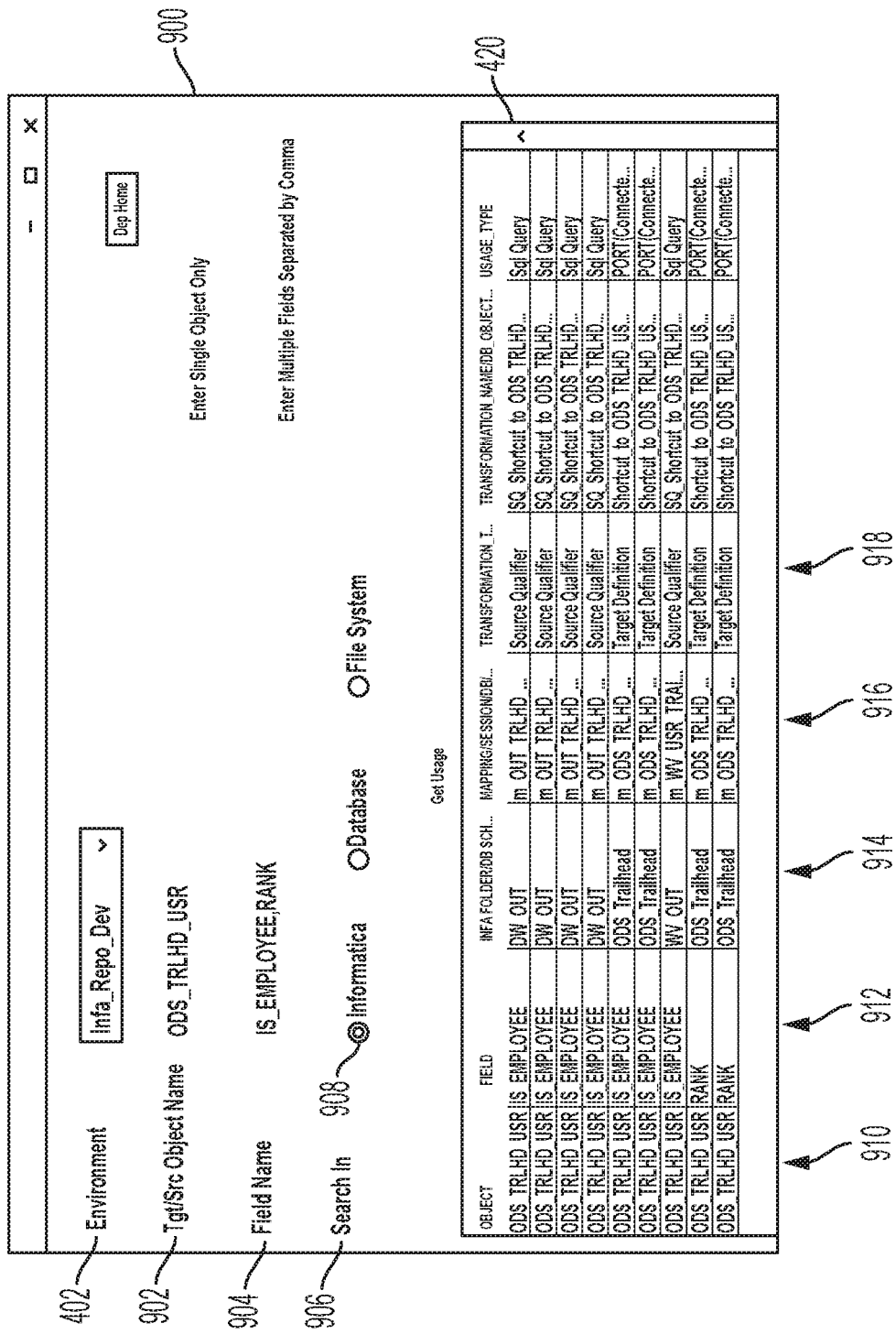

In FIG. 9, GUI 900 depicts a development environment 402, ODS_TRLHD_USER entered as the Object name at 902, and IS_EMPLOYEE, RANK entered as two separate field names, separated by a comma. The user may be prompted to request where a search location (906); in FIG. 9, the shaded radio dial 908 indicates that a data integration system is a selected search location. At operation 1020, the controller 104 searches the data integration system 106 based on the user request. At operation 1022, the search results are formatted in accordance with the user inputs. At operation 1024, the formatted search results are displayed as a table in the portion 420. A first column 910 indicates the object name, and the second column 912 indicates the field name. In the example of FIG. 9, there are seven row entries with field name IS_EMPLOYEE, and two with field name RANK. Subsequent columns provide, for each row entry, a folder name 914, a mapping location 916, and whether the object in the row entry is a source or a target 918.

Accordingly, a user interface tool 102 and related methods for formatting mapping information from a data integration system has been described.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium, which may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A user interface tool, comprising:
a display system;
a processor programmed to generate and display a graphical user interface (GUI) on the display system and to accept user input responsive to the GUI, the GUI including (1) a prompt for a folder, and (ii) a prompt for a mapping name; and
a data integration system having stored therein a plurality of instances of mapping information related to S sources and T targets, wherein an instance of mapping information includes information related to a unique data transfer between a source of the S sources and a target of the T targets, wherein the data integration system stores metadata describing structure of each source that it is in communication with and the workflows that associate the sources and targets;
the processor programmed to receive, via the GUI, a user request that includes (i) the mapping name and (ii) the folder, the user request further specifying either a forward dependency or a backward dependency;
wherein the user request for a mapping level dependency further specifies an environment in the data integration system, from among: development, test, and production;
the processor programmed to respond to the user request by:
searching the data integration system for all instances of mapping information in the data integration system having the mapping name in the folder;
formatting a tree of found instances of mapping information having the mapping name in the folder to visually communicate a temporal flow of data, wherein the processor is further to constrain the found instances of mapping information to those within the environment;
displaying the found instances of mapping information of the user request on the GUI;
responsive to a received user selection of a found instance of mapping information having the mapping name in the folder, expanding a level in the tree of found instances to display either (a) entries for instances of mapping information that lead up to the found instance of the mapping name in the folder when the backward dependency is specified, or (b) entries for instances of mapping information that extend after the found instance of the mapping name in the folder when the forward dependency is specified.

2. The user interface tool of claim 1, wherein at least one of the instances in the tree of found instances is a target and at least one of the instances in the tree of found instances is a source.

3. The user interface tool of claim 2, wherein the processor is further to display the tree of found instances as a hierarchical directory structure of folders and files.

4. The user interface tool of claim 1, wherein the processor is further to receive user input that is a user request for a port dependency table, the user request for the port dependency table including a field name and an object name.

5. The user interface tool of claim 4, wherein the processor is to respond to the user request for the port dependency table by: searching the data integration system to thereby format a table of all instances of mapping information having both the field name and the object name; and displaying the port dependency table on the GUI on the display system.

6. The user interface tool of claim 5, wherein each entry of the port dependency table is uniquely labeled as a source, a target, or a folder.

7. The user interface tool of claim 1, wherein
the GUI includes selectable tiles, a tile of which indicates a mapping dependency; and
wherein receiving the user request for a mapping level dependency comprises:
determining that the user has selected the tile indicating the mapping dependency;
updating the graphical user interface to prompt the user to enter the mapping name and folder name, responsive to the user selection of the tile indicating the mapping dependency; and
receiving alphanumeric user input for the mapping name and folder name.

8. The user interface tool of claim 7, wherein
the GUI further includes a control element for selecting forward dependency and a control element for selecting backward dependency; and
wherein receiving the user request further includes determining when the user has selected the control element indicating forward dependency and determining when the user has selected the control element indicating backward dependency.

9. The user interface tool of claim 1, wherein
the GUI includes selectable tiles, a tile of which indicates a port dependency table; and
wherein receiving the user request for a port dependency table comprises:
determining that the user has selected the tile indicating the port dependency table; and
updating the GUI to prompt the user to enter an object name and a field name, responsive to the user selection of the tile indicating the port dependency table.

10. A processor-implemented method comprising:
formatting mapping information from a data integration system having stored therein a plurality of instances of mapping information related to S sources and T targets, wherein an instance of mapping information includes information related to a unique data transfer between a source of the S sources and a target of the T targets, wherein the data integration system stores metadata describing structure of each source that it is in communication with and the workflows that associate the sources and targets;
generating and displaying a graphical user interface (GUI) on a display system, the GUI including (i) a prompt for a folder, and (11) a prompt for a mapping name and accepting user input responsive thereto;
receiving user input that is a user request including a mapping name and a folder, the user request specifying either a forward dependency or a backward dependency;
wherein the user request for a mapping level dependency further specifies an environment in the data integration system, from among: development, test, and production;
responding to the user request by: searching the data integration system for all instances of mapping information in the data integration system having the mapping name in the folder and
formatting a tree of found instances of mapping information having the mapping name in the folder to visually communicate a temporal flow of data, wherein the found instances of mapping information is constrained to those within the environment;
displaying the found instances of mapping information of the user request on the GUI, and, on a designated portion of the GUI, displaying either (a) displaying the user request on the GUI, and, on a designated portion of the GUI, responsive to a received user selection of a found instance of mapping information having the mapping name in the folder, expanding a level in the tree of found instances to display either (a) entries for instances of mapping information that lead up to the mapping name in the folder when the backward dependency is specified, or (b) entries for instances of mapping information that extend after the found instance of the mapping name in the folder when the forward dependency is specified.

11. The method of claim 10, wherein at least one of the instances in the tree of found instances is a target and at least one of the instances in the tree of found instances is a source.

12. The method of claim 11, further comprising displaying the tree of found instances as a hierarchical directory structure of folders and files.

13. The method of claim 10, further comprising receiving user input that is a user request for a port dependency table, the user request for the port dependency table including a field name and an object name.

14. The method of claim 13, further comprising, responding to the user request for the port dependency table by: searching the data integration system to thereby format a table of all instances of mapping information having both the field name and the object name; and displaying the port dependency table on the display system.

15. The method of claim 14, further comprising, labeling each entry of the port dependency table as a source, a target, or a folder.

16. The method of claim 10, further comprising:
rendering, on the GUI, selectable tiles, one of which indicates a mapping dependency; and
wherein receiving the user request for a mapping level dependency comprises:
determining that the user has selected the tile indicating the mapping dependency;
updating the graphical user interface to prompt the user to enter the mapping name and folder name, responsive to the user selection of a tile indicating the mapping dependency; and
receiving alphanumeric user input for the mapping name and folder name.

17. The method of claim 16, further comprising:
rendering, on the GUI, a control element for selecting forward dependency and a control element for selecting backward dependency; and
wherein receiving the user request further includes determining when the user has selected the control element indicating forward dependency and determining when the user has selected the control element indicating backward dependency.

18. The method of claim 10, further comprising:
rendering, on the GUI, a selectable tile that indicates a port dependency table; and
wherein receiving the user request for a port dependency table comprises:
determining that the user has selected the selectable tile indicating the port dependency table; and
updating the GUI to prompt the user to enter an object name and a field name, responsive to the user selection of the tile indicating the port dependency table.

* * * * *

UNITED STATES PATENT AND TRADEMARK OFFICE
CERTIFICATE OF CORRECTION

PATENT NO. : 11,347,795 B2
APPLICATION NO. : 16/536017
DATED : May 31, 2022
INVENTOR(S) : Prateek Tandon et al.

Page 1 of 1

It is certified that error appears in the above-identified patent and that said Letters Patent is hereby corrected as shown below:

In the Claims

Column 8, Line 9, "(1)" should be changed to --(i)--;
Column 9, Line 49, "(11)" should be changed to --(ii)--;
Column 10, Line 3, the text "either (a) displaying" should be deleted.

Signed and Sealed this
Nineteenth Day of July, 2022

Katherine Kelly Vidal
*Director of the United States Patent and Trademark Office*